(12) United States Patent
Chen (10) Patent No.: US 8,903,450 B2
(45) Date of Patent: Dec. 2, 2014

(54) PORTABLE ELECTRONIC DEVICE WITH DISTANCE MEASURING DEVICE

(75) Inventor: Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 332 days.

(21) Appl. No.: 13/572,818

(22) Filed: Aug. 13, 2012

(65) Prior Publication Data

US 2013/0260824 A1 Oct. 3, 2013

(30) Foreign Application Priority Data

Mar. 28, 2012 (CN) .......................... 2012 1 0084950

(51) Int. Cl.
*H04M 1/00* (2006.01)

(52) U.S. Cl.
USPC .................. 455/556.1; 455/550.1; 455/456.6

(58) Field of Classification Search
CPC ......... H04N 5/23212; G01C 3/08; G01C 3/04
USPC .................... 455/456.3, 456.1, 41.3; 73/1.79; 342/118, 119, 125
See application file for complete search history.

(56) References Cited

U.S. PATENT DOCUMENTS

| | | | |
|---|---|---|---|
| 6,422,682 B1 * | 7/2002 | Kaneko et al. | 347/37 |
| 7,370,532 B2 * | 5/2008 | Osterkamp | 73/510 |
| 8,134,688 B2 * | 3/2012 | Shibazaki | 355/68 |
| 2008/0181354 A1 * | 7/2008 | Ueno | 377/24 |
| 2010/0097333 A1 * | 4/2010 | Skultety-Betz | 345/173 |
| 2010/0174421 A1 * | 7/2010 | Tsai et al. | 700/302 |
| 2014/0167745 A1 * | 6/2014 | Held et al. | 324/207.12 |

* cited by examiner

*Primary Examiner* — Lewis West
*Assistant Examiner* — Richard Chan
(74) *Attorney, Agent, or Firm* — Novak Druce Connolly Bove + Quigg LLP (57) ABSTRACT

A portable electronic device includes a main body, a display and a distance measuring device. The distance measuring device includes a first distance measuring member and a second distance measuring member. The first distance measuring member includes a first signal emitting/receiving module and an arithmetic module. The second distance measuring member includes a second signal emitting/receiving module and a control module. The first signal emitting/receiving module is for receiving an alignment signal, emitting a measuring signal, and receiving a feedback of a measuring signal. The arithmetic module is for calculating the distance between the first distance measuring member and the second distance measuring member. The distance is displayed. The second signal emitting/receiving module is for emitting the alignment signal, receiving the measuring signal, and emitting the feedback of the measuring signal. The present disclosure further provides a distance measuring method for a device.

17 Claims, 6 Drawing Sheets

PORTABLE ELECTRONIC DEVICE WITH DISTANCE MEASURING DEVICE

BACKGROUND

1. Technical Field

The present disclosure relates to an electronic device, particularly to a portable electronic device and a distance measuring device thereof.

2. Description of Related Art

A portable electronic device, such as a mobile phone, a MP3, a tablet computer, is popular because of its small size. The many functions of the portable electronic device encourage us to carry it with us all the time.

A distance measuring tool, such as a meter scale, may be used to measure a distance. However, the dedicated distance measuring tool is inconvenient to carry, this function should be incorporated into a portable electronic device.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

FIGS. 1 to 5 show an embodiment of a portable electronic device 100 including a main body 10, a plurality of buttons 50, a display 70 and a distance measuring device 90. The buttons 50 and the display 70 are mounted on the main body 10. The buttons 50 are connected to the distance measuring device 90, for activating and controlling the distance measuring device 90. The distance measuring device 90 is fixed within the main body 10, and is electrically connected to the display 70, for feeding back a measured distance to display in the display 70. In the illustrated embodiment, the portable electronic device 100 is a flip type mobile phone. The main body 10 includes a bottom cover 11, a top cover 13 slidably mounted on the bottom cover 11, and a protecting plate 15. The bottom cover 11 defines a mounting groove 113 at a sidewall. The top cover 13 defines a bar-type engaging slot 131 at an end surface thereof, and the top cover 13 forms a receiving portion 133 adjacent to the engaging slot 131. The receiving portion 133 defines an opening towards the engaging slot 131. The protecting plate 15 is mounted on the end surface of the top cover 13, for covering the engaging slot 131. The buttons 50 and the display 70 are mounted on a sidewall of the top cover 13 away from the bottom cover 11. In other embodiments, the number of the buttons 50 can be one or more.

The distance measuring device 90 includes a first distance measuring member 91, a second distance measuring member 93, and a driving member 95. The first distance measuring member 91 is received in the engaging slot 131 and electrically connected to the display 70, and can slide along the engaging slot 131 when driven by the driving member 95. The second distance measuring member 93 is detachably received in the mounting groove 113. The driving member 95 includes a driving portion 951 and a pinion portion 953 protruding from the driving portion 951 towards the first distance measuring member 91. The driving portion 951 is substantially cylindrical, and is received in the receiving portion 133. The pinion portion 953 extends from the opening of the receiving portion 133, and is connected to the first distance measuring member 91. In the illustrated embodiment, the driving member 95 is a motor.

The first distance measuring member 91 includes a first signal processing member 911, an alignment signal receiving port 912, a first measuring signal emitting port 913, a first measuring signal receiving port 914, and a rack portion 917. The first signal processing member 911 is received in the engaging slot 131, for receiving an alignment signal emitted by the second distance measuring member 93 before measuring a distance between the first distance measuring member 91 and the second distance measuring member 93, and for emitting a measuring signal to the second distance measuring member 93, receiving a feedback of the measuring signal from the second distance measuring member 93, and calculating the distance between the first distance measuring member 91 and the second distance measuring member 93 according to the feedback of the measuring signal.

The alignment signal receiving port 912, the first measuring signal emitting port 913, and the first measuring signal receiving port 914 are arranged apart on a sidewall of the first signal processing member 911 away from the driving member 95. The rack portion 917 protrudes from a sidewall of the first signal processing member 911 away from the alignment signal receiving port 912, and meshes with the pinion portion 953, thereby sliding along the engaging slot 131 when driven by the driving portion 951.

Figure 1:
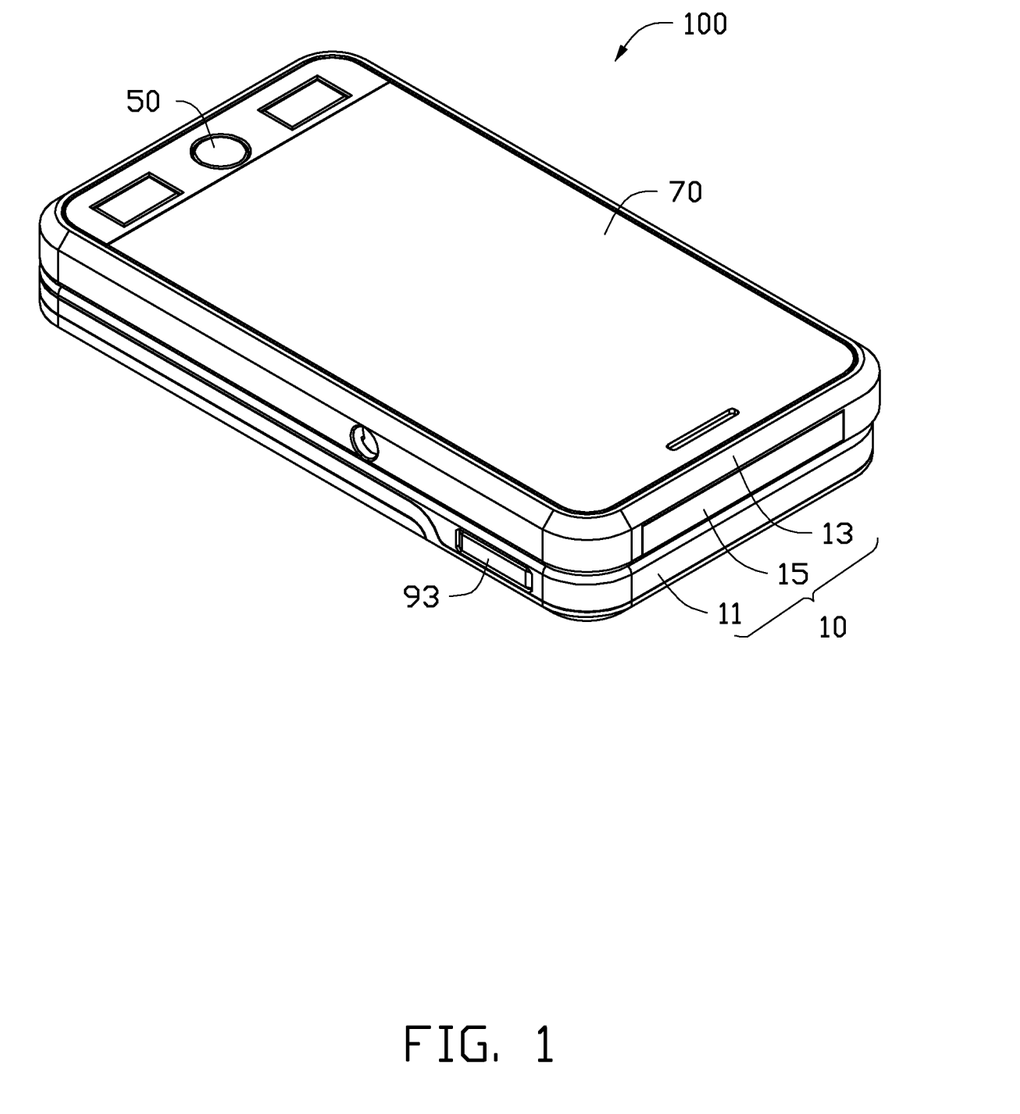
FIG. 1 is an isometric view of an embodiment of a portable electronic device.
Figure 2:
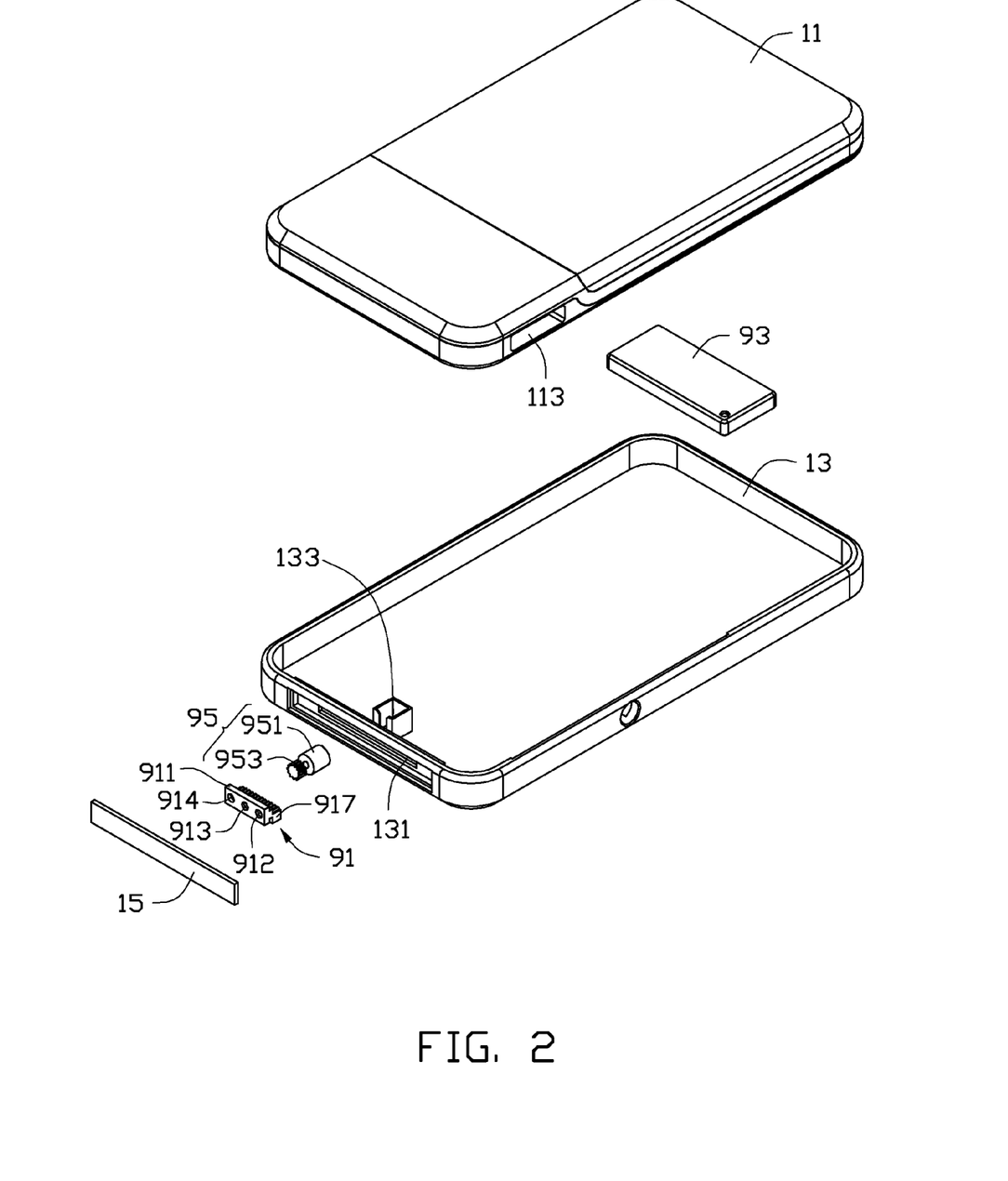
FIG. 2 is an exploded, isometric view of the portable electronic device shown in FIG. 1.
Figure 3:
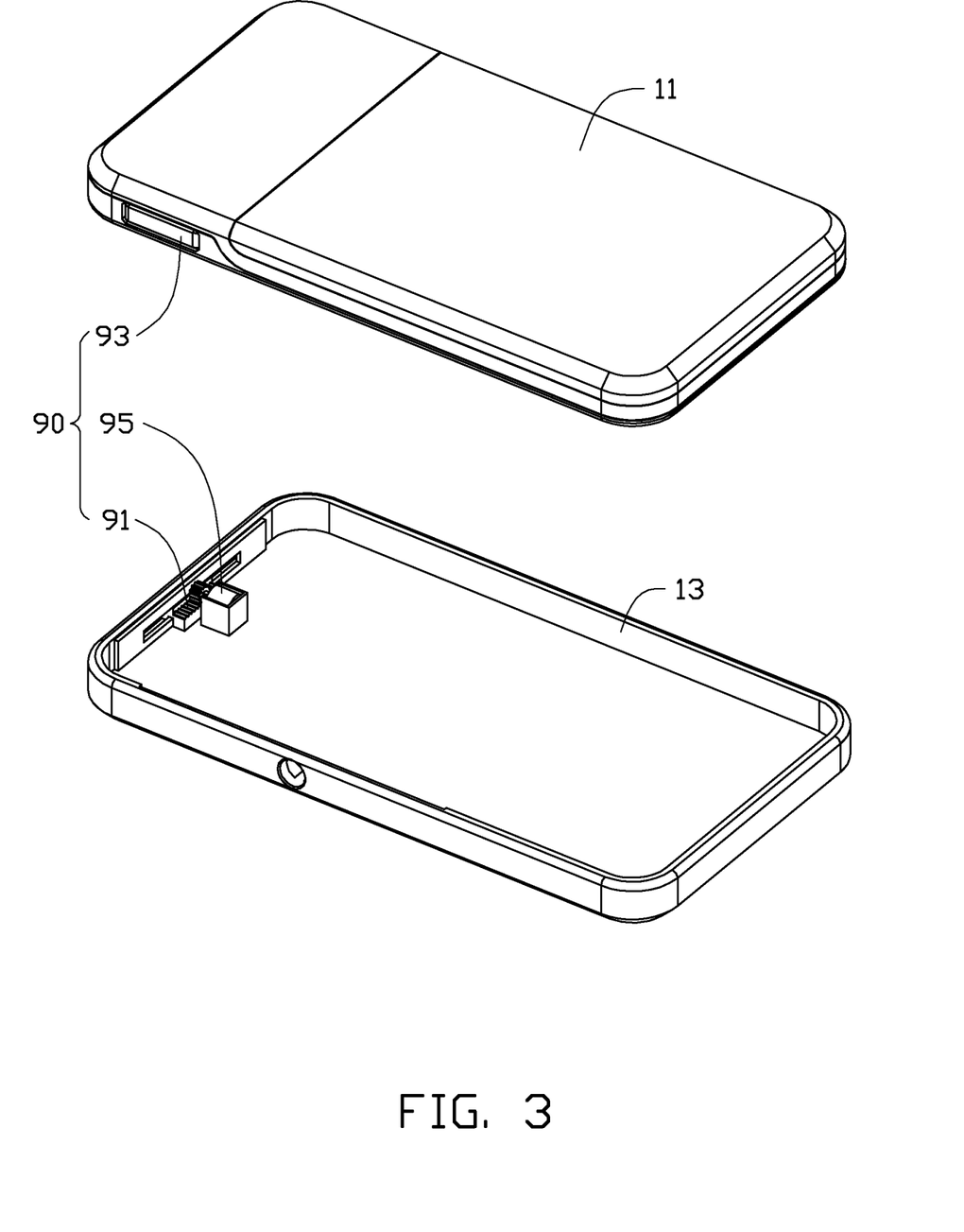
FIG. 3 is a partially exploded, isometric view of the portable electronic device shown in FIG. 1.
Figure 4:
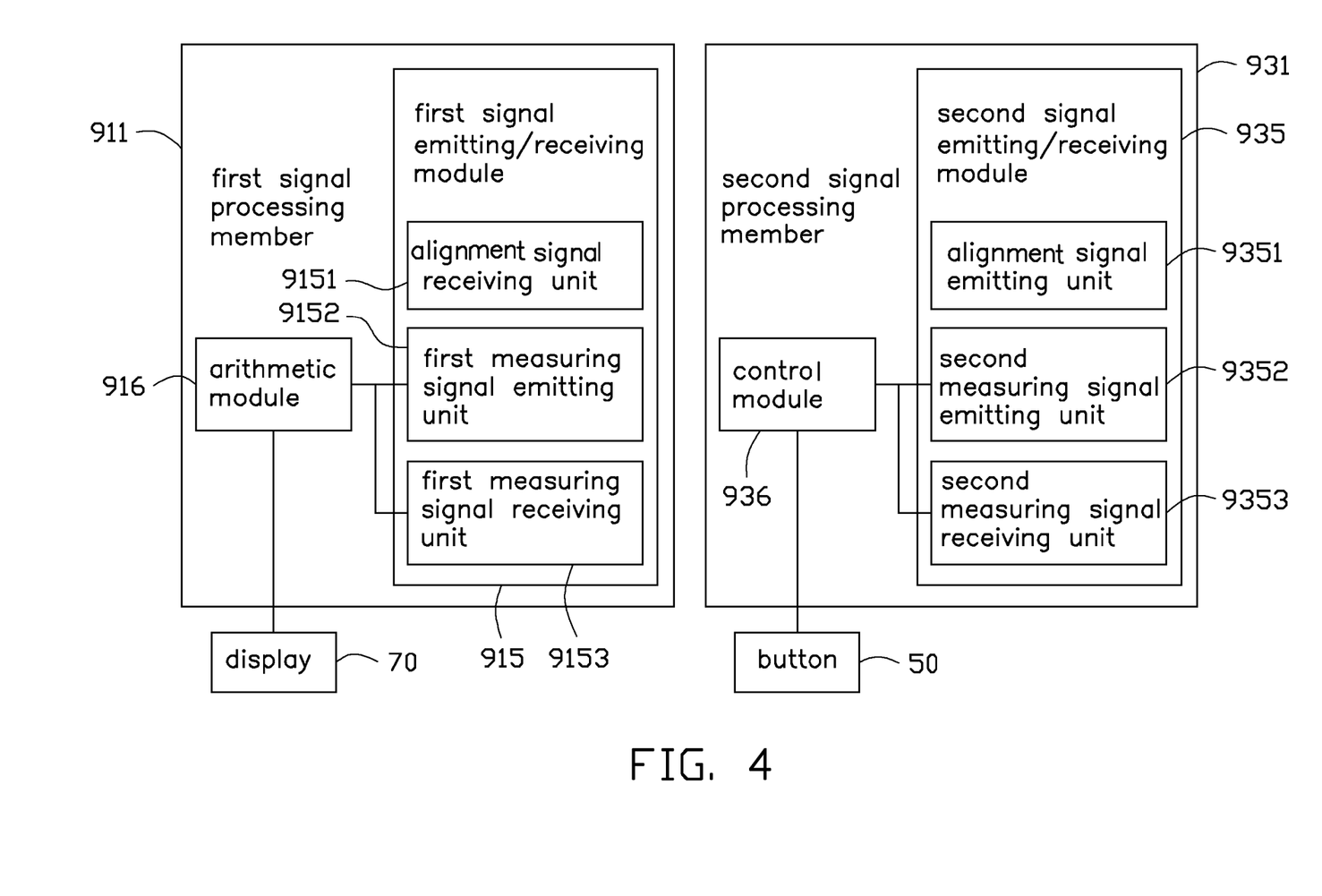
FIG. 4 is a block diagram of the portable electronic device shown in FIG. 1.

FIG. 4 shows the first signal processing member 911 further including a first signal emitting/receiving module 915 and an arithmetic module 916 received therein. The first signal emitting/receiving module 915 is for receiving the alignment signal emitted by the second distance measuring member 93 via the alignment signal receiving port 912 before measuring, and for emitting the measuring signal to the second distance measuring member 93 via the first measuring signal emitting port 913 when measuring, and for receiving the feedback of the measuring signal emitted by the second distance measuring member 93 via the first measuring signal receiving port 914, and then transmitting the feedback of the measuring signal to the arithmetic module 916. The arithmetic module 916 is electrically connected to the first signal emitting/receiving module 915, and is for calculating the distance between the first distance measuring member 91 and the second distance measuring member 93 according to an interval time from the first signal processing member 911 emitting the measuring signal to receive the feedback of the measuring signal, and a transmission velocity of the measuring signal which data is prestored in the arithmetic module 916.

The first signal emitting/receiving module 915 includes an alignment signal receiving unit 9151, a first measuring signal emitting unit 9152, and a first measuring signal receiving unit 9153. The alignment signal receiving unit 9151 is for receiving the alignment signal emitted by the second distance measuring member 93 via the alignment signal receiving port 912 before measuring. The first measuring signal emitting unit 9152 is for emitting the measuring signal to the second distance measuring member 93 via the first measuring signal emitting port 913 when carrying out a measurement. The first measuring signal receiving unit 9153 is for receiving the feedback of the measuring signal emitted by the second distance measuring member 93 via the first measuring signal receiving port 914, and then transmitting the feedback measuring signal to the arithmetic module 916.

Figure 5:
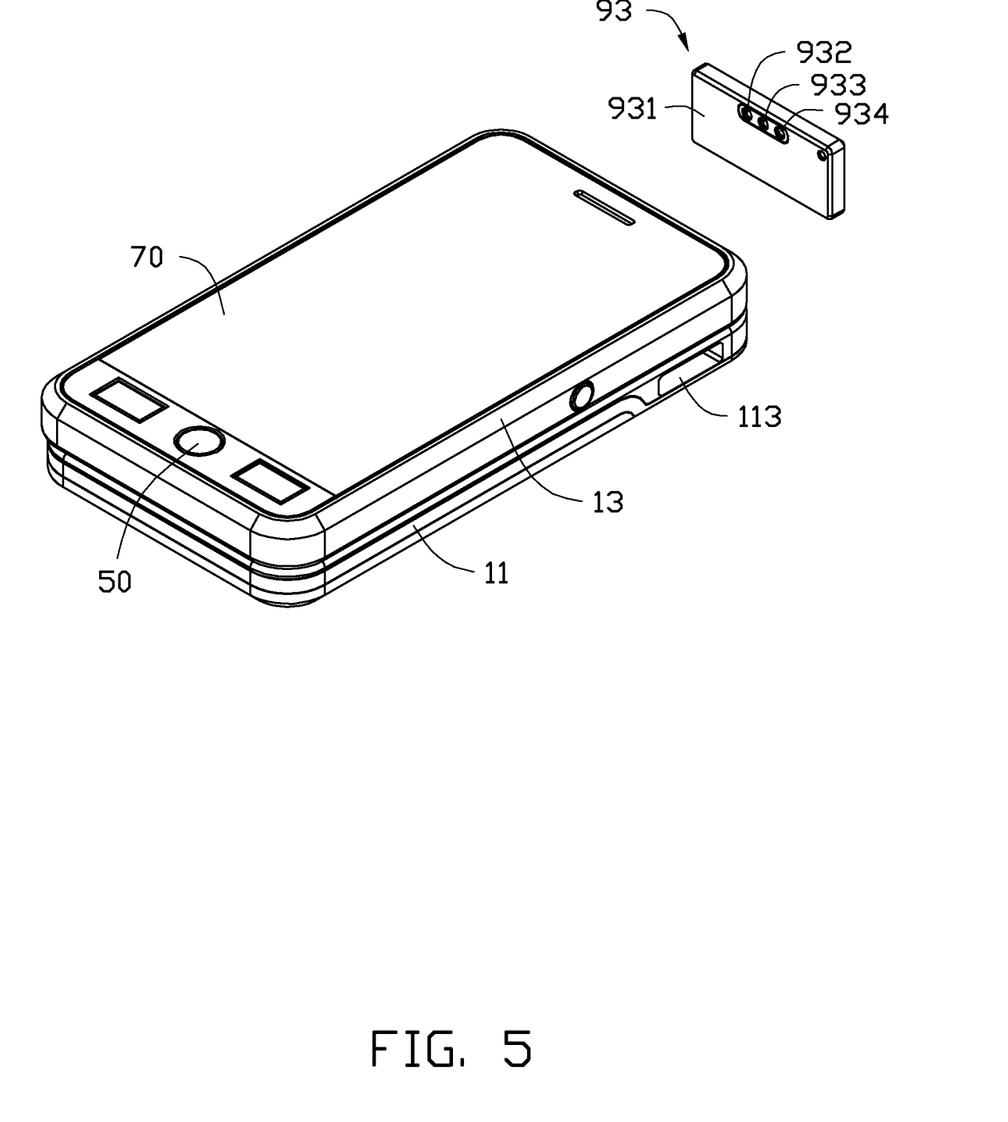
FIG. 5 is a view of the portable electronic device shown in FIG. 1 in use.

FIG. 5 shows the second distance measuring member 93 including a second signal processing member 931, an alignment signal emitting port 932, a second measuring signal receiving port 933, and a second measuring signal emitting port 934. The second signal processing member 931 is detachably received in the mounting groove 113, and is electrically connected to the buttons 50. The second signal processing member 931 is for emitting the alignment signal before measuring, receiving the measuring signal emitted by the first signal processing member 911, and feeding back the measuring signal to the first signal processing member 911. The alignment signal emitting port 932, the second measuring signal receiving port 933, and the second measuring signal emitting port 934 are positioned at a sidewall of the second signal processing member 931.

The second signal processing member 931 further includes a second signal emitting/receiving module 935 and a control module 936 received therein. The second signal emitting/receiving module 935 is for emitting the alignment signal via the alignment signal emitting port 932 before carrying out a measurement, and for receiving the measuring signal emitted by the first signal processing member 911 via the second measuring signal receiving port 933, and feeding back the measuring signal via the second measuring signal emitting port 934 to the first signal processing member 911. The control module 936 is electrically connected to the second signal emitting/receiving module 935 and the buttons 50. The control module 936 is for controlling the second signal emitting/receiving module 935 to emit the alignment signal via the alignment signal emitting port 932 before measuring, and for controlling the second signal emitting/receiving module 935 to feed back the measuring signal via the second measuring signal emitting port 934 when receiving the measuring signal via the second measuring signal receiving port 933.

The second signal emitting/receiving module 935 includes an alignment signal emitting unit 9351, a second measuring signal emitting unit 9352, and a second measuring signal receiving unit 9353. The alignment signal emitting unit 9351 is for emitting the alignment signal via the alignment signal emitting port 932 to the alignment signal receiving unit 9151 before measuring. The second measuring receiving unit 9353 is for receiving the measuring signal emitted by the first measuring signal emitting unit 9152 via the second measuring signal receiving port 933. The second measuring signal emitting unit 9352 is for feeding back the measuring signal via the second measuring signal emitting port 934 to the first measuring signal receiving unit 9153.

Figure 6:
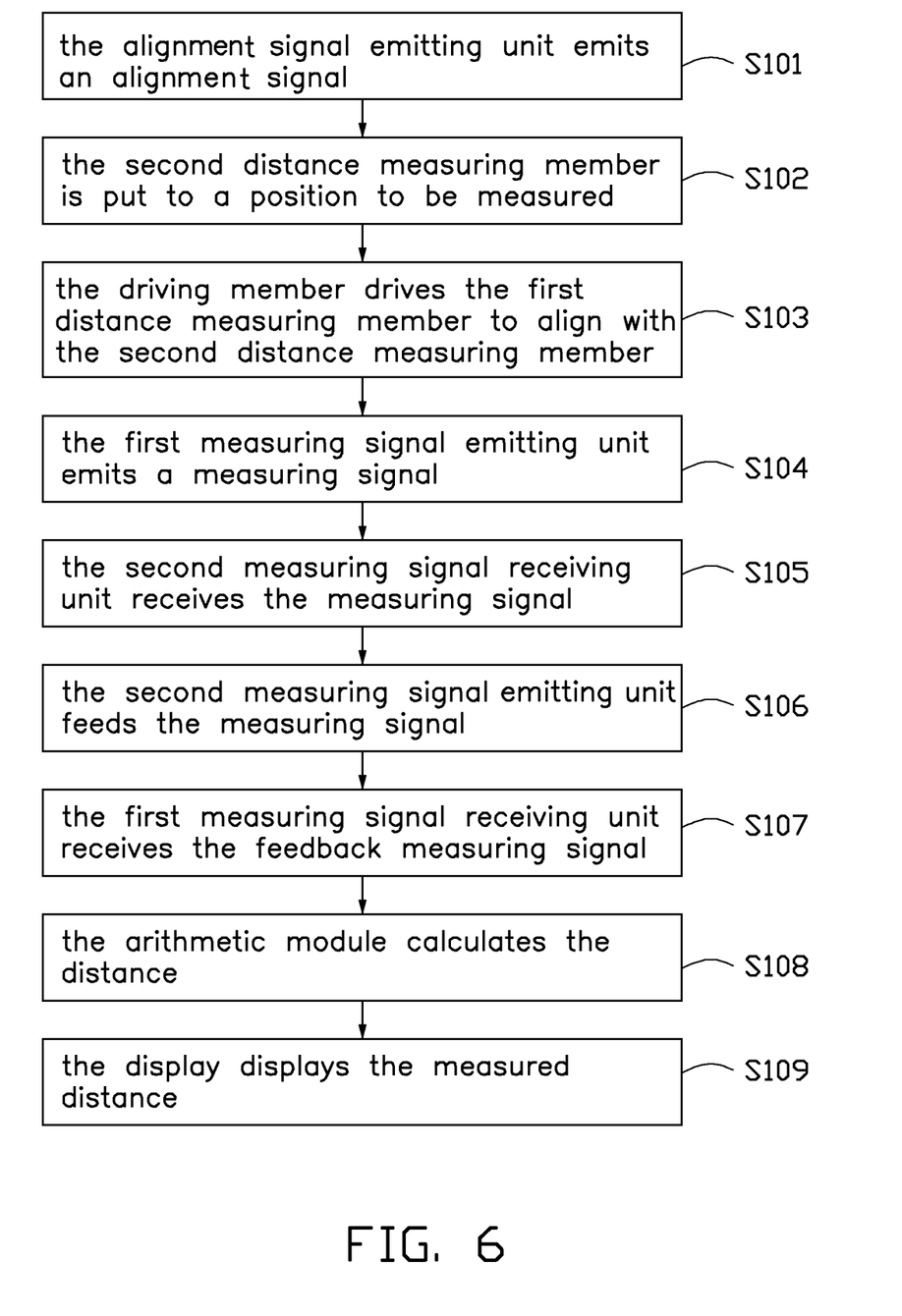
FIG. 6 is a flowchart of the portable electronic device shown in FIG. 1.

FIG. 6 shows the steps taken by the portable electronic device 100 when the distance measuring device 90 measures a distance:

Step S101, the protecting plate 15 is removed, and a button 50 is pressed to activate the second distance measuring member 93. The control module 936 of the second signal processing member 931 controls the alignment signal emitting unit 9351 to emit an alignment signal via the alignment signal emitting port 932. In the illustrated embodiment, the alignment signal is an emission of infrared light.

Step S102, the second distance measuring member 93 is removed from the mounting groove 113, and is put in a position to be measured. The alignment signal emitting port 932 faces the first distance measuring member 91.

Step S103, the driving member 95 drives the first distance measuring member 91 to slide along the engaging slot 131 until the alignment signal receiving unit 9151 receives the alignment signal emitted by the alignment signal emitting unit 9351.

Step S104, the first measuring signal emitting unit 9152 emits a measuring signal via the first measuring signal emitting port 913. The transmission velocity of the measuring signal is defined as "V". In the illustrated embodiment, the measuring signal is a beam of infrared. In another embodiment, the measuring signal can be a laser, for example.

Step S105, the second measuring signal receiving unit 9353 receives the measuring signal via the second measuring signal receiving port 933.

Step S106, the control module 936 controls the second measuring signal emitting unit 9352 to feed back the measuring signal via the second measuring signal emitting port 934. The interval from the second measuring signal receiving unit 9353 receiving the measuring signal to the second measuring signal emitting unit 9352 emitting the feedback of the measuring signal is defined as "T1".

Step S107, the first measuring signal receiving unit 9153 receives the feedback of the measuring signal via the first measuring signal receiving port 914. The interval from the first measuring signal emitting unit 9152 emitting the measuring signal to the first measuring signal receiving unit 9153 receiving the feedback of the measuring signal is defined as "T2".

Step S108, the arithmetic module 916 calculates the distance between the first distance measuring member 91 and the second distance measuring member 93. The value of the distance equals to (T2−T1)*V/2.

Step S109, the arithmetic module 916 transmits the value of the distance to the display 70.

In another embodiment, the second distance measuring member 93 can be mounted on another portion of the main body 10, such as suspended from the main body 10 as an ornamental part. The interval time "T1" can be omitted because the interval time "T1" is extremely short. The arithmetic module 916 can be mounted in the main body 10, or be integrated into a CPU of the portable electronic device 100.

Because the first distance measuring member 91 and the second distance measuring member 93 are aligned before a measuring operation, the portable electronic device 100 can measure the distance between the first distance measuring member 91 and the second measuring member 93 with great precision.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A portable electronic device, comprising:
a main body;
a display mounted on the main body; and
a distance measuring device comprising a first distance measuring member and a second distance measuring member, the first distance measuring member mounted in the main body, and electrically connected to the display, the first distance measuring member comprising a first signal emitting/receiving module and an arithmetic module electrically connected to the first signal emitting/receiving module, the second distance measuring member detachably mounted in the main body, and functioning with the first distance measuring member when carrying out a measurement, the second distance measuring member comprising a second signal emitting/receiving module and a control module electrically connected to the second signal emitting/receiving module;

wherein the first signal emitting/receiving module is configured to receive an alignment signal emitted by the second signal emitting/receiving module before carrying out the measurement, emit a measuring signal to the second signal emitting/receiving module when measuring, receive a feedback of the measuring signal emitted by the second signal emitting/receiving module, and transmit the feedback of the measuring signal to the arithmetic module; the arithmetic module is configured to calculate a distance between the first distance measuring member and the second distance measuring member, the display displays a value of the distance; the second signal emitting/receiving module is configured to emit the alignment signal to the first signal emitting/receiving module before measuring, receive the measuring signal emitted by the first signal emitting/receiving module, and feed back the measuring signal to the first signal emitting/receiving module controlled by the control module.

2. The portable electronic device of claim 1, wherein the first signal emitting/receiving module comprises an alignment signal receiving unit, a first measuring signal emitting unit, and a first measuring signal receiving unit; the alignment signal receiving unit is configured to receive the alignment signal emitted by the second signal emitting/receiving module before measuring; the first measuring signal emitting unit is configured to emit the measuring signal to the second signal emitting/receiving module when measuring; the first measuring signal receiving unit is configured to receive the feedback of the measuring signal emitted by the second signal emitting/receiving module, and transmit the feedback of the measuring signal to the arithmetic module.

3. The portable electronic device of claim 2, wherein the second signal emitting/receiving module comprises an alignment signal emitting unit, a second measuring signal receiving unit, and a second measuring signal emitting unit; the alignment signal emitting unit is configured to emit the alignment signal to the alignment signal receiving unit before measuring; the second measuring signal receiving unit is configured to receive the measuring signal emitted by the first measuring signal emitting unit; the second measuring signal emitting unit is configured to feed back the measuring signal to the first measuring signal receiving unit controlled by the control module.

4. The portable electronic device of claim 3, wherein the first distance measuring member further comprises a first signal processing member, and an alignment signal receiving port, a first measuring signal receiving port and a first measuring signal emitting port positioned on the first signal processing member; the first signal emitting/receiving module and the arithmetic module are received in the first signal processing member; the alignment signal receiving unit is configured to receive the alignment signal emitted by the alignment signal emitting unit via the alignment signal receiving port before measuring; the first measuring signal emitting unit is configured to emit the measuring signal to the second measuring signal receiving unit via the first measuring signal emitting port when measuring; the first measuring signal receiving unit is configured to receive the feedback of the measuring signal emitted by the second measuring signal emitting unit via the first measuring signal receiving port.

5. The portable electronic device of claim 4, wherein the first distance measuring member is slidably mounted on the main body; the distance measuring device further comprises a driving member mounted in the main body; the first distance measuring member further comprises a rack portion formed at a side of the first signal processing member; the rack portion is connected to the driving member; the driving member drives the first signal processing member to slide relative to the main body via the rack portion.

6. The portable electronic device of claim 5, wherein the driving member comprises a driving portion and a pinion portion connected to the driving portion; the pinion portion meshes with the rack portion.

7. The portable electronic device of claim 6, wherein the main body defines an engaging slot at a sidewall thereof, and forms a mounting portion adjacent to the engaging slot; the first distance measuring member is received in the engaging slot, and the rack portion towards the mounting portion; the driving portion is mounted on the mounting portion, and the pinion portion extends from the mounting portion and meshes with the rack portion.

8. The portable electronic device of claim 3, wherein the second distance measuring member further comprises a second signal processing member and an alignment signal emitting port, a second measuring signal receiving port, a second measuring signal emitting port at a sidewall of the second signal processing member; the second signal emitting/receiving module and the control module are received in the second signal processing member; the alignment signal emitting unit is configured to emit the alignment signal to the alignment signal receiving unit via the alignment signal emitting port before measuring; the second measuring signal receiving unit is configured to receive the measuring signal emitted by the first measuring signal emitting unit via the second measuring signal receiving port; the second measuring signal emitting unit is configured to feed back the measuring signal to the first measuring signal receiving unit via the second measuring signal emitting port.

9. The portable electronic device of claim 1, further comprising at least one button electrically connected to the control module, wherein the at least one button is configured to activate the second distance measuring member, thereby the control module controls the second signal emitting/receiving module emitting the alignment signal to the first signal emitting/receiving module.

10. The portable electronic device of claim 1, wherein the main body defines a mounting groove, and the second distance measuring member is received in the mounting groove.

11. A distance measuring device, comprising:
a first distance measuring member comprising a first signal emitting/receiving module and an arithmetic module electrically connected to the first signal emitting/receiving module; and
a second distance measuring member functioning with the first distance measuring member when measuring, the second distance measuring member comprising a second signal emitting/receiving module and a control module electrically connected to the second signal emitting/receiving module;
wherein the first signal emitting/receiving module is configured to receive an alignment signal emitted by the second signal emitting/receiving module before measuring, emit a measuring signal to the second signal emitting/receiving module when measuring, receive a feed measuring signal emitted by the second signal emitting/ receiving module, and transmit the feedback of the measuring signal to the arithmetic module; the arithmetic module is configured to calculate the distance between the first distance measuring member and the second distance measuring member; the second signal emitting/receiving module is configured to emit the alignment signal to the first signal emitting/receiving module before measuring, receive the measuring signal emitted by the first signal emitting/receiving module, and feed back the measuring signal to the first signal emitting/receiving module controlled by the control module.

12. The distance measuring device of claim 11, wherein the first signal emitting/receiving module comprises an alignment signal receiving unit, a first measuring signal emitting unit, and a first measuring signal receiving unit; the alignment signal receiving unit is configured to receive the alignment signal emitted by the second signal emitting/receiving module before measuring; the first measuring signal emitting unit is configured to emit the measuring signal to the second signal emitting/receiving module when measuring; the first measuring signal receiving unit is configured to receive the feedback of the measuring signal emitted by the second signal emitting/receiving module, and transmit the feedback measuring signal to the arithmetic module.

13. The distance measuring device of claim 12, wherein the second signal emitting/receiving module comprises an alignment signal emitting unit, a second measuring signal receiving unit, and a second measuring signal emitting unit; the alignment signal emitting unit is configured to emit the alignment signal to the alignment signal receiving unit before measuring; the second measuring signal receiving unit is configured to receive the measuring signal emitted by the first measuring signal emitting unit; the second measuring signal emitting unit is configured to feed back the measuring signal to the first measuring signal receiving unit controlled by the control module.

14. The distance measuring device of claim 13, wherein the first distance measuring member further comprises a first signal processing member, and an alignment signal receiving port, a first measuring signal receiving port and a first measuring signal emitting port positioned on the first signal processing member; the first signal emitting/receiving module and the arithmetic module are received in the first signal processing member; the alignment signal receiving unit is configured to receive the alignment signal emitted by the alignment signal emitting unit via the alignment signal receiving port before measuring; the first measuring signal emitting unit is configured to emit the measuring signal to the second measuring signal receiving unit via the first measuring signal emitting port when measuring; the first measuring signal receiving unit is configured to receive the feedback of the measuring signal emitted by the second measuring signal emitting unit via the first measuring signal receiving port.

15. The distance measuring device of claim 14, further comprising a driving member; wherein the first distance measuring member further comprises a rack portion formed at a side of the first signal processing member; the rack portion is connected to the driving member; the driving member drives the first signal processing member to slide via the rack portion.

16. The distance measuring device of claim 15, wherein the driving member comprises a driving portion and a pinion portion connected to the driving portion; the pinion portion meshes with the rack portion.

17. The distance measuring device of claim 13, wherein the second distance measuring member further comprises a second signal processing member and an alignment signal emitting port, a second measuring signal receiving port, a second measuring signal emitting port at a sidewall of the second signal processing member; the second signal emitting/receiving module and the control module are received in the second signal processing member; the alignment signal emitting unit is configured to emit the alignment signal to the alignment signal receiving unit via the alignment signal emitting port before measuring; the second measuring signal receiving unit is configured to receive the measuring signal emitted by the first measuring signal emitting unit via the second measuring signal receiving port; the second measuring signal emitting unit is configured to feed back the measuring signal to the first measuring signal receiving unit via the second measuring signal emitting port.

* * * * *